Patented June 2, 1936

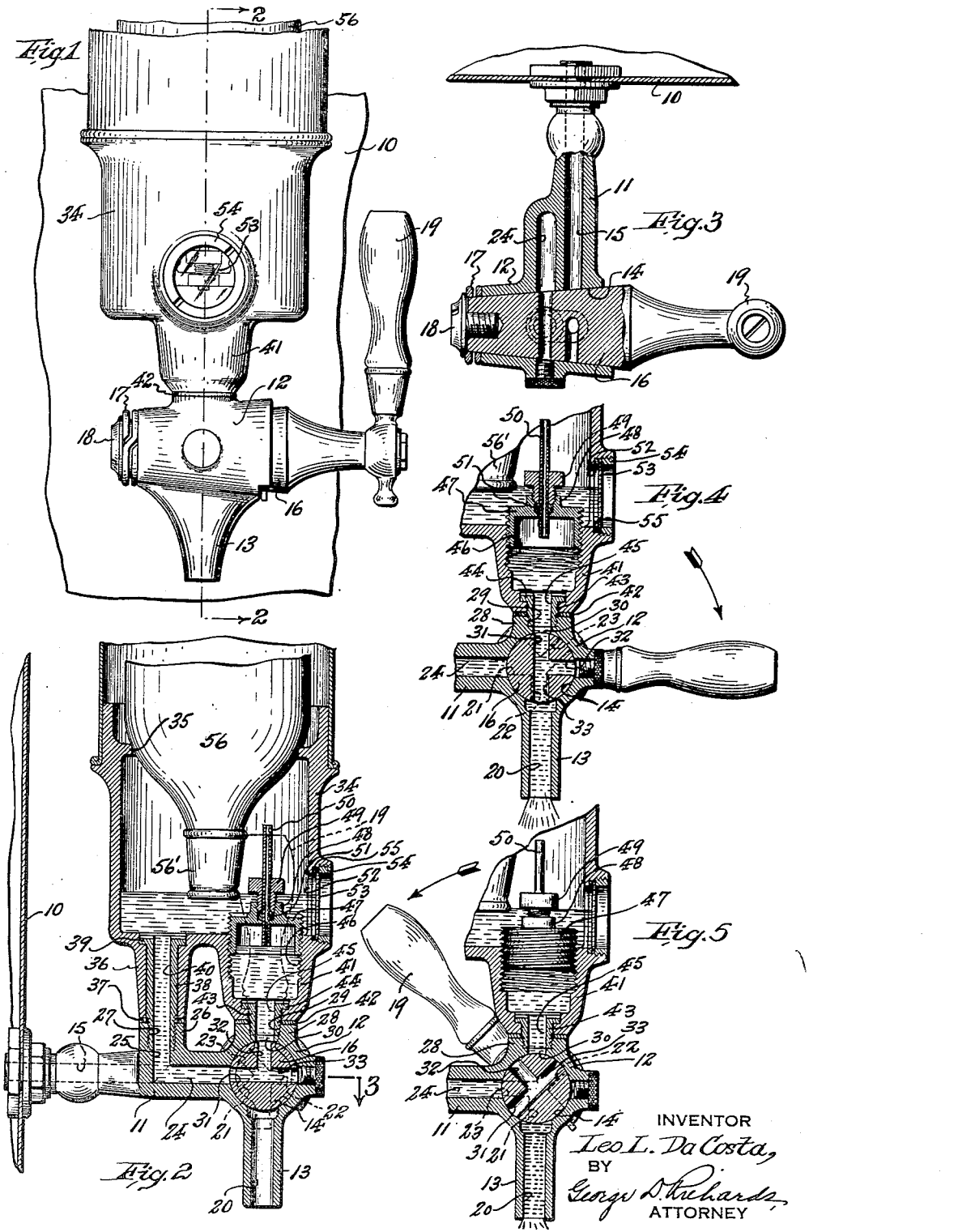

2,042,928

UNITED STATES PATENT OFFICE 2,042,928

LIQUID DISPENSING MEANS

Leo L. Da Costa, Brooklyn, N. Y.

Application June 19, 1935, Serial No. 27,296

4 Claims. (Cl. 225—26)

This invention relates to an improved means for dispensing liquids from separate sources of supply thereof and mixing, at will, a measured or predetermined quantity of one liquid with the other.

This invention has for its general object to provide in combination with a dispensing faucet leading from a source of supply of a primary liquid, a means for supplying to and mixing with said primary liquid a predetermined quantity of a secondary liquid.

The invention has for a further object to provide a novel, compact, simple and easily manipulated faucet combination of the kind mentioned, including means to support a container carrying a supply of liquid to be dispensed in measured amounts, together with means for measuring predetermined quantities of said liquid prior to discharge thereof from the faucet.

The invention has for another object to provide a novel construction and arrangement of measuring means, which is capable of quick and easy adjustment to vary the volume of the measured quantity of liquid dispensed at will; and which is so devised that free and unimpeded flow of liquid to and from the measuring means is assured.

Other objects of this invention, not at this time more particularly enumerated, will be understood from the following detailed description of the same.

An illustrative embodiment of the invention is shown in the accompanying drawing, in which:—

Fig. 1 is a front elevation of the novel liquid dispensing faucet according to this invention; Fig. 2 is a vertical longitudinal section therethrough, taken on line 2—2 in Fig. 1; Fig. 3 is a horizontal section, taken on line 3—3 in Fig. 2; and Figs. 4 and 5 are respectively fragmentary vertical sections showing different operative positions of the faucet valve.

Similar characters of reference are employed in the hereinabove described views, to indicate corresponding parts.

For the purposes of illustration, the novel dispensing faucet will be described as used to mix with hot water a measured quantity of coffee syrup, thus delivering a fresh coffee drink ready for consumption. In the drawing, the reference character 10 indicates an urn or reservoir for storing a supply of hot water. Suitably secured to said urn or reservoir 10, so as to communicate with the interior thereof, is the main body or shank 11 of the faucet. At its outer extremity, the faucet body or shank 11 is provided with a transverse valve casing 12, from the lower side of which projects a discharge spout 13. Extending through the main body or shank 11, from the reservoir 10 to the interior bore 14 of the valve casing 12, is a primary liquid or water delivery duct 15. The interior bore 14 of the valve casing 12 is preferably of tapered conformation to provide a liquid tight seat for a correspondingly tapered rotatable valve plug 16, which is mounted therein, and which is retained in seated relation thereto by spring means 17 and cap-screw 18 at the tapered end of the plug, such as commonly employed in this type of valve. At its opposite end, the valve plug 16 is provided with a handle member 19, by which the same can be manipulated. Formed in the valve plug 16 is a three-way primary liquid or water valve port for cooperation with the water delivery duct 15 so as to afford communication between the latter and the discharge passage 20 of the spout 13. This three-way water valve port comprises three centrally connected radial branches, viz. branch 21, branch 22 and branch 23, the outer ends of which are disposed in circumferentially spaced relation at the surface of said valve plug 16.

Also formed in the body or shank 11 of the faucet, to communicate at its outer end with the interior bore 14 of valve casing 12, is a secondary liquid or coffee syrup supply duct 24, the inlet end 25 of which is formed in a laterally and upwardly extending neck 26 having an internally threaded portion 27. The valve casing 12 also has a laterally and upwardly extending neck 28 likewise provided with an internally threaded portion 29 and a passage 30 communicating with the bore 14 of valve casing 12. Formed in the valve plug 16 is a three-way secondary liquid or coffee syrup valve port for cooperation with the coffee syrup supply duct 24 so as to selectively afford communication between the latter and said passage 30 or communication between the passage 30 and the discharge passage of the spout 13. This three-way port comprises three centrally connected radial branches, viz. the branch 31, branch 32 and branch 33, the outer ends of which are disposed in circumferentially spaced relation at the surface of said valve plug 16.

The reference character 34 indicates a combined container support and trap-well, the same having an open top below which is provided an internal annular supporting flange or shoulder 35. Depending from the bottom of said trap-well is a tubular extension 36, which is aligned with the neck 26 of faucet body or shank 11 so as to abut thereon, a sealing washer 37 being interposed between the ends of said extension and neck. Said extension 36 and neck 26 are joined together by a tubular bolt 38, the threaded end of which screws into the internally threaded portion 27 of said neck, while its flanged head 39 is countersunk in the bottom of said trap-well. The bore 40 of said bolt 38 provides a discharge passage in communication between the interior of said trap-well and said coffee syrup supply duct 24.

Integrally formed with and depending from the bottom wall of said trap-well is a measuring cup 41, which is aligned with the neck 28 of valve casing 12 so as to abut thereon, a sealing washer 42 being interposed between the ends of said cup and neck. Said cup 41 and neck 28 are joined together by a tubular bolt 43, the threaded end of which screws into the internally threaded portion 29 of said neck, while its flanged head 44 is countersunk in the bottom of the cup. The bore 45 of said bolt 43 provides a communicating passage between the cup interior and passage 30 of the valve casing. The upper end of said cup 41 is internally screw threaded, as at 46, to receive a closing plug 47 to seal the upper end of the cup against direct communication with the liquid contained in the trap-well 34. Formed in the top wall of this plug is a stuffing-box 48 and gland 49 therefor. Extending through said gland and stuffing box is a vertically adjustable tube 50, which functions as a means for varying the capacity of the cup as well as an air vent means communicating with the interior of the latter. A suitable packing 51 is packed in the stuffing-box 48 and held in place by the gland 49 around the tube 50 so as to seal the joint between the same and said closing plug 47.

To permit observation of the interior of trap-well 34 for ascertaining that the supply of liquid delivered thereinto is continuing and adequate, an opening 52 is provided in the side wall of said trap-well, said opening being closed by a transparent panel 53 held in place by a bezel 54, and sealed against leakage by a gasket 55.

The combined container support and trap-well 34 is adapted to receive the open end of an inverted container, such as the bottle 56, which contains a supply of secondary liquid to be dispensed in measured amounts. In the illustrative use of the device, the bottle 56 contains the coffee syrup which is desired to be delivered in predetermined quantities with the dispensed hot water so as to mix therewith and produce a discharge of coffee beverage from the faucet. When the bottle 56 is opened and inverted and supported by the shoulder 35 so as to upstand from the trap-well 34, its downturned open neck 56' will be opposed to but spaced upwardly from the floor or bottom of the trap-well interior, so that the syrup may discharge from the bottle into the bottom of said trap-well, filling the latter until the level of syrup therein reaches and seals the bottle opening against further emission of syrup from the bottle.

When the valve plug 16 occupies normal position, with the controlling handle 19 in upstanding position, as shown in Figs. 1 and 2, communication between the water duct 15 and discharge spout passage 20 will be shut off and communication between the trap-well 34 and measuring cup 41 will be established, while at the same time communication between said measuring cup 41 and the discharge spout passage 20 will be likewise shut off. In such position of the valve plug, the valve port branch 31 will be aligned with the coffee syrup supply duct 24 and the valve port branch 32 will be aligned with the passages 30—45 leading to the interior of the measuring cup 41. Under these circumstances coffee syrup will flow from the trap-well 34 through the passage 40, 25 and 24, thence through the valve port branches 31, 32 upwardly through passage 30—45 into the interior of the measuring cup, rising therein until the level thereof reaches the inwardly projecting lower end of vent tube 50, so as to seal the latter against outward escape of air from the upper interior of the measuring cup, and thus arresting further inflow of syrup into the measuring cup. It will thus be obvious that the measured quantity of syrup may be varied and nicely adjusted to the exact amount desired to be utilized, by adjusting the vent tube 50 for greater or less extent of projection into the measuring cup interior, and consequently that control and variation of the volume of the measured quantity can be easily attained at will, without regard to or dependence upon the liquid level within the trap-well; and consequently the total content of bottle and trap-well may be dispensed before a renewed supply of syrup is provided. The inspection window 53 allows the operator to observe at a glance when renewal of the supply of syrup is required. This arrangement and operation of the measuring cup means is much more flexible with regard to attaining an exact measurement of just that quantity of syrup required for mixing with a cup of hot water, than has heretofore been available, and therefore constitutes one of the important features of this invention.

When it is desired to discharge from the faucet into a cup a measured charge of syrup together with hot water to fill the cup, and produce by mixture with the syrup a cupful of coffee beverage, the valve handle 19 is pulled forwardly and down to horizontal position, as shown in Fig. 4. This movement of the handle 19 rotates the valve plug 16 in clockwise direction, and shifts the valve ports into the relations open communication between duct 15 and discharge spout passage 13 and between the measuring cup and said discharge spout passage 13. Under these circumstances hot water will flow from the urn or reservoir 10 through duct 15, thence through valve port branches 21—22 for discharge through the spout passage 20; while simultaneously the measured quantity of syrup previously delivered into the measuring cup will flow downwardly therefrom through passages 45, 30 and valve port branches 31, 33 for discharge through the spout passage 20, whereby the syrup is, at the same time, intermixed with the outgoing hot water. Under these conditions the duct 24 will be closed by the valve plug 16 and communication between the trap well and measuring cup will be interrupted or shut off.

If it is desired at any time to dispense hot water from the urn or reservoir 10, without simultaneously discharging and mixing therewith the coffee syrup, the handle 19 is swung downwardly from its normal vertical position to the angular position shown in Fig. 5. This movement of the handle 19 rotates the valve plug 16 in an anti-clockwise direction, and moves said valve plug to a position whereby the same blocks communication between the trap-well and measuring cup, and between the measuring cup and discharge spout passage 20, the valve port branches 31, 32 and 33 being displaced from communication with the ducts and passages serving these parts; under these circumstances, however, the valve port branch 23 will be aligned in communication with the water duct 15 and the associated valve port branch 21 will be aligned in communication with the discharge spout passage 20, thereby permitting free flow of hot water alone out of the faucet discharge spout 13.

From the above description it will be aparent that a very compact, simple and efficient dispensing means for controlling the flow of a plurality of liquids, one of which is measured and then dispensed for intermixture with the other as both are discharged is provided by the instant invention; and that the novel dispensing means also comprises a very easily manipulated means for regulating the measuring capacity of the means for segregating predetermined quantities of the measured liquid prior to dispensing the same.

While I have, for the purpose of illustration, described the dispensing means as operative to measure dispensed quantities of coffee syrup for mixture with hot water in the production of coffee beverage, it will be obvious that the device may be utilized for any other specific purposes or with any other combinations of liquids capable of being and desired to be intermixed.

I am aware that various changes may be made in the above described constructions, and that various embodiments of this invention could be made without departing from the scope of the invention as defined in the following claims. It is consequently intended that all matter contained in the foregoing description or shown in the accompanying drawing shall be interpreted as illustrative and not in a limiting sense.

I claim:—

1. Liquid dispensing means comprising a faucet having a primary duct from a primary liquid source and a secondary duct, a trap-well mounted on said faucet to communicate with said secondary duct, said trap-well being adapted to receive and support an inverted secondary liquid container, a valve casing having a discharge spout, a closed measuring cup connected with said valve casing, said measuring cup having a vertically adjustable combined air vent and capacity regulating means entering into the upper interior thereof, and a valve member rotatable in said casing to selectively control flow of secondary liquid from said trap-well into said measuring cup, or discharge of secondary liquid from said measuring cup in accompanying relation to discharge of primary liquid through said valve casing discharge spout.

2. Liquid dispensing means comprising a faucet having a primary duct from a primary liquid source and a secondary duct, a trap-well mounted on said faucet to communicate with said secondary duct, said trap-well being adapted to receive and support an inverted secondary liquid container, a valve casing having a discharge spout, a closed measuring cup connected with said valve casing, said measuring cup having a vertically adjustable combined air vent and capacity regulating means entering into the upper interior thereof, and a valve member rotatable in said casing to selectively control flow of secondary liquid from said trap-well into said measuring cup, or discharge of secondary liquid from said measuring cup in accompanying relation to discharge of primary liquid through said valve casing discharge spout, or discharge of primary liquid through said valve casing discharge spout unaccompanied by discharge of secondary liquid.

3. Liquid dispensing means comprising a faucet having a primary liquid duct to lead from a primary liquid source, a secondary liquid duct to lead from a secondary liquid source, and a discharge spout; a measuring cup communicating with said faucet through its bottom end, means for closing the top end of said measuring cup, a combined air vent and capacity regulating tube vertically adjustable through the closed top end of said measuring cup; a rotatable valve means having a three-way valve port cooperative with said secondary liquid duct, said measuring cup and said discharge spout, said valve means also having port means cooperative with said primary liquid duct and said discharge spout; a trap-well communicating with the inlet end of said secondary liquid duct, and means for supporting an open inverted secondary liquid container in and spaced from the bottom wall of said trap-well.

4. Liquid dispensing means comprising a faucet having a primary liquid duct to lead from a primary liquid source, a secondary liquid duct to lead from a secondary liquid source, and a discharge spout; a measuring cup communicating with said faucet through its bottom end, means for closing the top end of said measuring cup, a combined air vent and capacity regulating tube vertically adjustable through the closed top end of said measuring cup; a rotatable valve means having a three-way valve port cooperative with said secondary liquid duct, said measuring cup and said discharge spout, said valve means also having port means cooperative with said primary liquid duct and said discharge spout; a trap-well communicating with the inlet end of said secondary liquid duct, means for supporting an open inverted secondary liquid container in and spaced from the bottom wall of said trap-well, and a liquid tight glazed inspection opening in the side wall of said trap-well.

LEO L. DA COSTA.